United States Patent [19]
Eslinger et al.

[11] Patent Number: 5,613,744
[45] Date of Patent: Mar. 25, 1997

[54] INCIPIENT BRAKE FADE DETECTION FOR TRACTION CONTROL SYSTEMS

[75] Inventors: Ralph G. Eslinger, Elvria; Gerard O. McCann, Amherst, both of Ohio

[73] Assignee: Allied Signal, Inc., Morris Township, Morris County, N.J.

[21] Appl. No.: 448,674

[22] Filed: May 24, 1995

[51] Int. Cl.$^6$ .................................................. B60T 8/34
[52] U.S. Cl. ........................ 303/191; 303/145; 303/113.2
[58] Field of Search .................................. 303/145, 191, 303/113.2; 364/426.01, 426.03, 557

[56] References Cited

U.S. PATENT DOCUMENTS

| | | | |
|---|---|---|---|
| 4,477,124 | 10/1984 | Watanabe | 303/191 |
| 4,842,343 | 1/1989 | Akiyoshi et al. | 303/68 |
| 4,912,641 | 3/1990 | Kuwana et al. | 364/426.02 |
| 4,962,824 | 10/1990 | Hagiya et al. | 180/197 |
| 4,997,236 | 3/1991 | Naito et al. | 364/426.02 |
| 5,125,723 | 6/1992 | Sakuma et al. | |
| 5,136,508 | 8/1992 | Bannon et al. | 364/426.01 |
| 5,156,449 | 10/1992 | Wetzel | 303/113.2 |
| 5,174,636 | 12/1992 | Burgdorf et al. | 303/116.1 |
| 5,178,440 | 1/1993 | Yagi et al. | 303/61 X |
| 5,205,622 | 4/1993 | Gee | 303/113.2 |
| 5,217,284 | 6/1993 | Willmann | 303/113.2 |
| 5,232,272 | 8/1993 | Berisch et al. | 303/113.3 |
| 5,236,256 | 8/1993 | Schmidt et al. | 303/113.2 |

*Primary Examiner*—Robert J. Oberleitner
*Assistant Examiner*—Peter M. Poon

[57] ABSTRACT

A motor vehicle brake control system having traction control and incorporating controller features and methods of operation which interrupt activation of the traction control system in conditions likely to develop excessive brake temperatures, exceed available brake pressure limitations, or other adverse brake conditions. This feature is provided by monitoring the behavior of the system, and based on known braking system characteristics, disabling the traction control when certain parameters are exceeded. The system provides these features without the need to directly measure brake temperature, brake system pressure or other physical parameters.

7 Claims, 4 Drawing Sheets

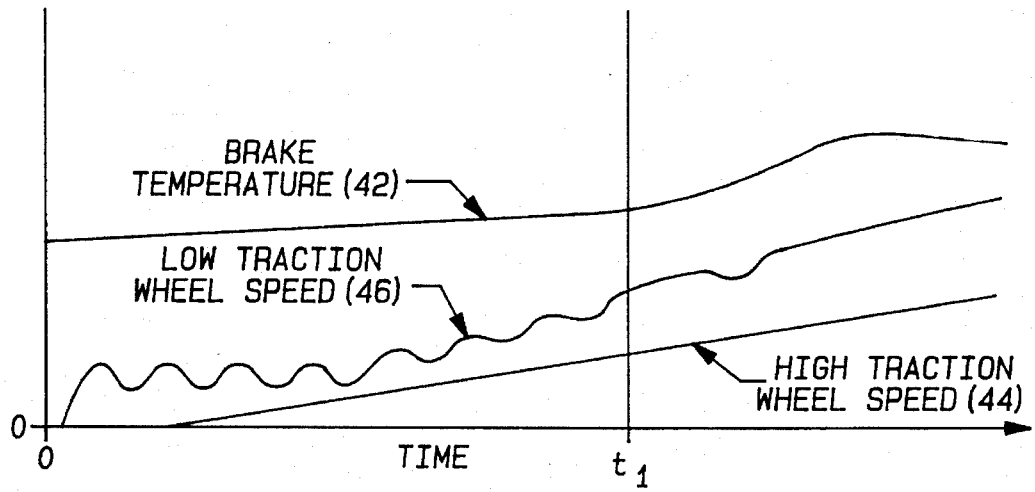
PRIOR ART Fig-2
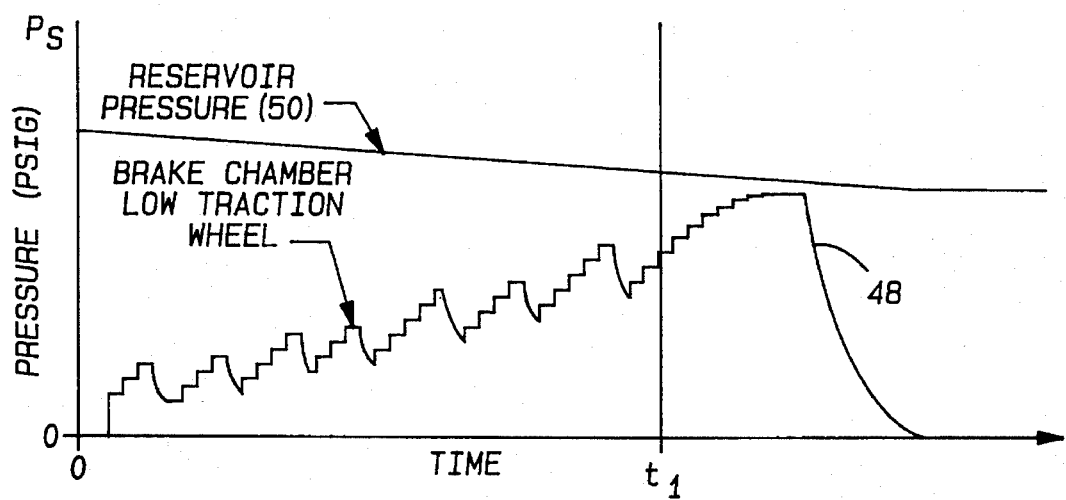
PRIOR ART Fig-3

INCIPIENT BRAKE FADE DETECTION FOR TRACTION CONTROL SYSTEMS

BACKGROUND AND SUMMARY OF THE INVENTION

This invention is related to motor vehicle brake control systems and particularly to an improved traction control system incorporating features to reduce the likelihood of developing adverse brake conditions through operation of traction control.

Many motor vehicles today incorporate traction control systems. These systems enhance the directional stability of a vehicle and the total traction availability in conditions where one or more of the drive wheels encounters a low coefficient of friction surface or otherwise develops a wheel spinning condition. The tractive effort available from the spinning wheel is decreased due to the spinning condition. Moreover, most motor vehicles incorporate a differential in which torque applied to the non-spinning wheel on one side of the vehicle is reduced when the drive wheel on the other side encounters a spinning condition. Therefore, total tractive effort is reduced. With traction control, the speeds of the drive wheels are detected and compared with the other wheels on the vehicle. In the case of a vehicle that is also equipped with an anti-lock brake system (ABS), this comparison can be made with all of the wheels on the vehicle. To remedy a wheel spinning condition, the traction control system may reduce engine torque through a control link to the engine controller. In addition, such systems typically also activate the service brake of the spinning wheel, gently pumping the brake to slow the spinning wheel speed. This brake application to the spinning wheel allows the drive differential to transmit higher torque to other drive wheels. Such traction control systems are found in passenger cars having hydraulic braking systems as well as heavy duty trucks employing air brake systems.

In some driving conditions a traction control system can be operating for considerable period of time. For example, in the case of a heavy duty truck climbing a long grade in low traction conditions, a traction control system may activate a service brake on a driving wheel over repeated cycles. However, service braking systems have inherent energy dissipation limits. Accordingly, in such conditions, brake friction material temperatures, and rotor or drum temperatures can reach extreme levels. Since braking torque decreases in such conditions, a condition referred to as brake "fade" occurs and thus continued traction control performance decreases. More importantly however, since time is necessary for the brake parts to cool, braking performance could be degraded and excessive friction material wear occurs. In air brake systems, brake application uses high pressure air stored in a reservoir which becomes depleted through repeated brake application over a short duration. In view of this, it may further be desirable to disable traction control to preserve braking air pressure.

As one means of avoiding the above referenced condition, brake component temperature measurements could be taken. A thermocouple or other temperature sensor can be embedded within a brake lining or other brake part. Through the use of an associated controller, excessively high brake temperatures can be monitored and could also be used to disable a traction control system to preclude brake fade conditions. Alternatively, direct brake pressure measurements could be taken and used to disable traction control in some conditions. Although such systems are believed operable, they would require a significant addition of hardware to a vehicle and would complicate assembly and servicing. In addition, maintenance and reliability problems could be presented.

In view of the foregoing, there is a need for an improved traction control system and method of operating such a system which would reduce the likelihood of adverse brake conditions occurring through operation of traction control.

Since traction control systems require wheel speed inputs and active brake controllers, they are almost universally provided on vehicles also having ABS. In fact, in many cases traction control is provided as an enhancement to an ABS with little or no additional hardware. Through appropriate control algorithms and software, an ABS controller can be operated to provide traction control.

In accordance with the present invention, the development of adverse brake conditions due to traction control operation is prevented through a system and control method which monitors the activity of the traction control system and using assumptions about brake system characteristics, disables the traction control system in some operating conditions.

Further objects, features and advantages of the invention will become apparent from a consideration of the following description and the appended claims when taken in connection with the accompanying drawings.

BRIEF DESCRIPTION OF THE DRAWINGS

FIG. 2 is a graph showing brake temperature, and low and high traction wheel speed verses time for a vehicle undergoing unconstrained traction control operation;

FIG. 3 is a graph showing air brake system reservoir pressure as well as brake chamber pressure for a spinning wheel under unconstrained traction control operation and corresponds with the system behavior shown in FIG. 2;

DETAILED DESCRIPTION OF THE PREFERRED EMBODIMENTS

While various types of motor vehicle braking systems can incorporate the features of the present invention including hydraulic and air brake systems, this invention is described in connection with an air brake system of a type typically used for heavy duty truck applications. Such a system is shown diagrammatically in FIG. 1 and is generally designated by reference number 10.

Figure 1:
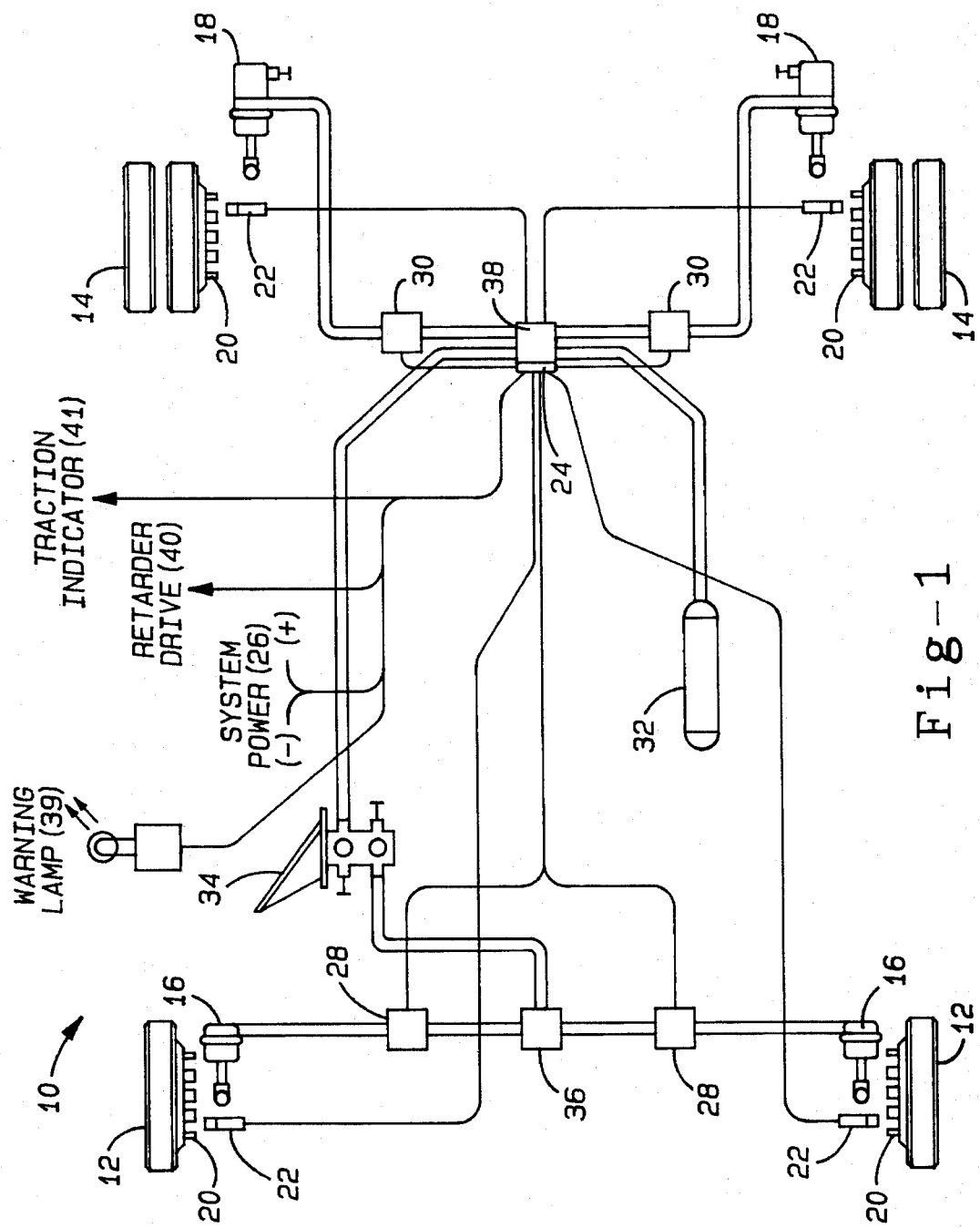
FIG. 1 is a schematic diagram of a heavy-duty truck air braking system incorporating ABS and traction control and incorporating the features of the present invention.

FIG. 1 shows various components connected by solid lines which designate electrical connections, whereas parallel lines show air flow conduits. As also shown in FIG. 1, system 10 includes front axle wheels 12 which are steered and rear axle wheels 14 which are driven to provide traction. Since system 10 is an air brake system, front axle brake actuators 16 are provided which are linked to brake shoes when drum type brakes are used, or a caliper for a disc brake to exert braking action on the associated wheels. Similarly, rear axle brake actuators 18 are also provided to exert braking action. Rear brake actuators 18 also incorporate an internal spring which engages the brake when air pressure is not applied to the system, thus providing a parking and emergency brake feature. In order to move the vehicle, air pressure must be applied to actuators 18 to overcome the force exerted by the internal springs in order to release the braking system.

ABS and traction control systems require wheel speed input signals which are provided through the use of an exciter or tone ring 20 which rotates with each of the wheels. Wheel speed sensors 22 mounted to the vehicle chassis are positioned adjacent exciter rings 20 and provide an output in the form of an AC signal which varies in voltage and frequency as the speed of the wheel increases or decreases. Variable reluctance transducers are frequently employed for this application in which the flux density in the gap between exciter 20 and wheel speed sensor 22 varies as the exciter teeth move across a pole piece of the wheel speed sensor.

Brake control system 10 is controlled by electronic control unit 24 which receives wheel speed signals from each of the associated wheel speed sensor 22 and receives system power from the vehicle power supply 26. Electronic control unit 24 includes an internal computer along with interface components for controlling system 10. Front axle brake modulators 28 and rear axle brake modulator 30 are provided adjacent to each of the vehicle wheels and are connected with associated brake actuators 16 and 18. Modulators 28 and 30 provide a means by which the electronic control unit 24 modifies air pressure to actuators 16 and 18 to apply the service brakes. Solenoid valves (not shown) contained in modulators 28 and 30 provide the electrical interface between electronic control unit 24 and the mechanical components of the air brake system. Electronic control unit 24 is capable of simultaneously and independently controlling the four individual brake modulator assemblies 28 and 30.

The brake control system 10 includes an air pressure accumulator tank 32 which serves as a high pressure reservoir. Service brake valve 34 is actuated by the vehicle operator to manually activate the service brakes. Separate front and rear axle brake systems are provided. The front brake system including quick release valve 36 which receives air pressure signals for the front axle and through front axle brake modulators 28, sends air pressure signals to front axle brake actuators 16. In a similar manner, air pressure signals are sent to rear axle brake actuators 18 through traction valve 38 and modulator 30. Electronic control unit 24 is conveniently mounted directly to traction valve 38, but could be mounted elsewhere if desired.

As further shown in FIG. 1, ABS warning light 39 is provided to warn the operator of a failed system. Retarder drive output 40 disables a dynamic braking system in conditions where its operation could result in wheel lock-up. Traction indicator 41 notifies the operator that the system is operative.

Brake control system 10 incorporates ABS features in which the deceleration rate of each of the road wheels is monitored during braking actions. In the event of wheel lock-up or incipient lock-up, appropriate control signals are directed to that wheel's brake modulator to relieve braking effort in accordance with conventional ABS system operation.

As discussed previously, traction control features of system 10 use differential braking action across the driven axle to enhance a vehicle's traction capabilities. Situations can arise where due to either incipient brake fade, or system pressure or friction limitations, system 10 is no longer effective in transferring driving torque from the low traction wheel to the high traction wheel. Allowing continued operation of the traction control system when either pressure or friction limits have been reached can result in significant brake lining wear. This condition is diagrammatically illustrated in FIGS. 2 and 3. With time on the horizontal axis, various parameters are depicted in FIGS. 2 and 3. Time in both figures is plotted over a period from the beginning of a traction control operation sequence to the point where adverse braking system conditions are encountered. As shown by curve 42 in FIG. 2, brake temperature increases gradually until a critical condition is reached at which a significant rise in brake temperature is exhibited. This high temperature condition can result in significant brake lining wear and brake fade conditions. Also plotted on FIG. 2 are curves showing wheel speeds of wheels on a driving axle in which one wheel encounters low friction coefficient conditions while the other maintains tractive engagement with the road. Curve 44 depicts the high traction wheel speed which is shown gradually increasing over time but does not encounter spinning conditions. However, on the opposite side of the vehicle, a low traction wheel speed depicted by curve 46 encounters a low coefficient of friction condition or other condition which leads to wheel spinning. The cyclical variation in low traction wheel speed occurs through the operation of the traction control features of brake control system 10.

Figure 4:
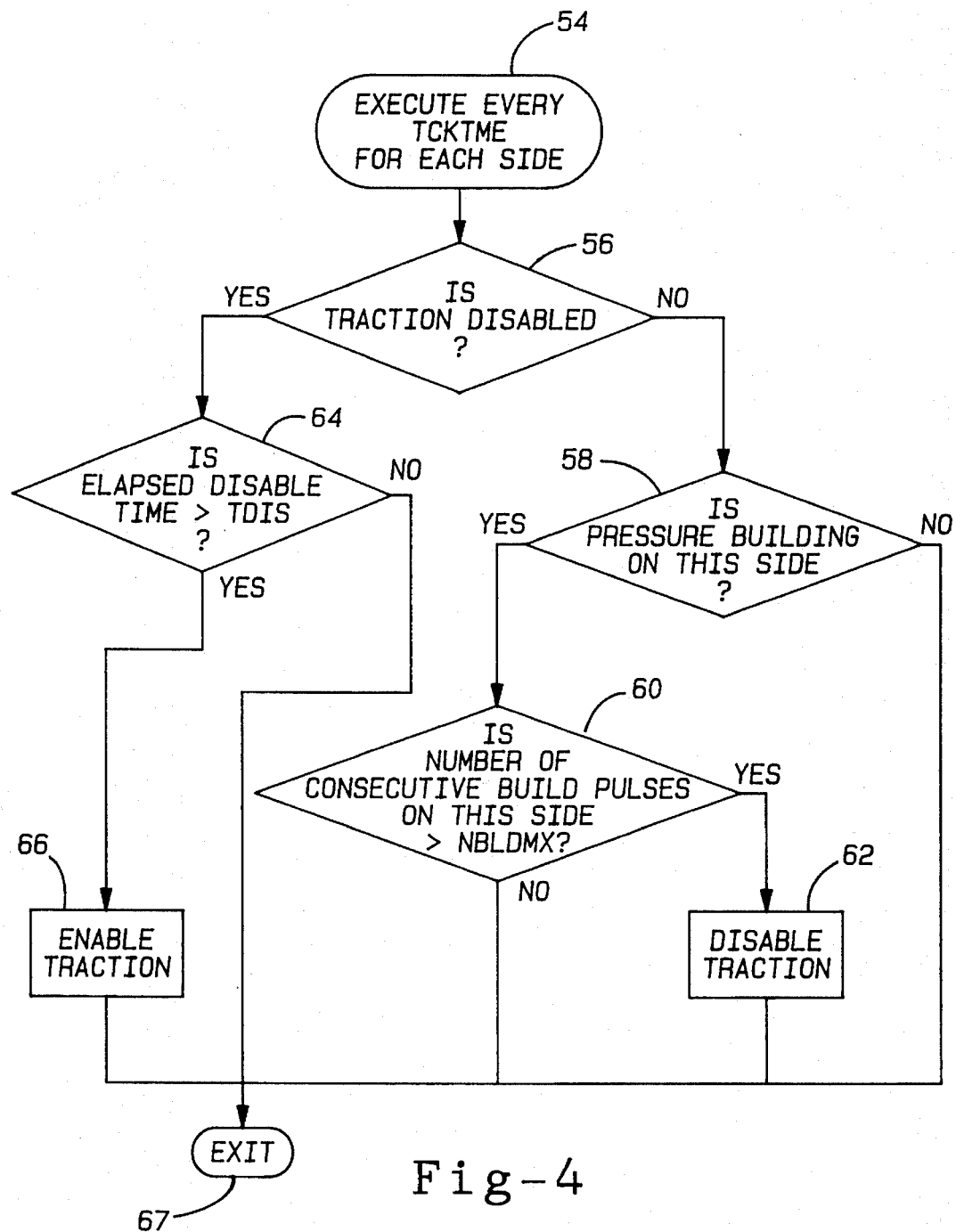
FIGS. 4 and 5 are logic flow charts of two embodiments of the traction control system and method of the present invention.

In FIG. 3, brake chamber air pressure is plotted in which the brake is cyclically "pumped" on curve 48 against time for the spinning wheel. FIG. 4 shows additional system parameters corresponding to the behavior shown in FIG. 3 and the time axis for FIG. 3 corresponds directly to FIG. 2. Brake chamber air pressure as plotted is the pressure signal passing through the brake modulator 30 which activates the service brake. In a typical traction control operation sequence, a given pressure build command will result in a pressure increase with subsequent build commands further increasing the pressure applied to the brake of a low traction wheel. This action is designated by the saw-tooth pressure build command shown in FIG. 3. The step-wise increase in pressure occurs due to the fact that electronic control unit 24 including an internal clock and the system is controlled in a digital manner based on the clock rate. The step-wise increases in pressure occurs until the system detects wheel speed decreasing producing a ramp-down exhaust command. The result is the cyclically varying low traction wheel speed shown by curve 46.

When either brake fade or pressure limitations are encountered the sequence of pressure build commands without an exhaust command will appear as shown in FIG. 3 after $t_1$. As is shown after $t_1$ there is an increased time over which the chamber pressure builds, followed by an exhaust command. Since system 10 is having greater difficulty in slowing the spinning wheel which may occur due to high brake temperatures. Other factors may lead to the inability of the system to provide the desired braking effect traction control. For example, the brake system pressure available from accumulator 32 depicted by curve 50 may be reduced through repeated activation of the spinning wheel brake actuator. In some conditions reservoir pressure can reach a point where adverse braking conditions exist.

The curves of FIGS. 2 and 3 indicate a sequence of operation of a brake control system without the features of the present invention.

In accordance with the present invention, when the number of consecutive build commands from control unit 24 (i.e. ramp-up steps of brake chamber pressure) or the time before an exhaust command exceeds a predetermined number or time, the traction control features of system 10 will cease to operate. In such conditions, the system will remain inoperative for a predetermined time period to allow either the brake components to cool or the system pressure to recover, afterwhich normal traction control system operation will be restored.

Figure 5:
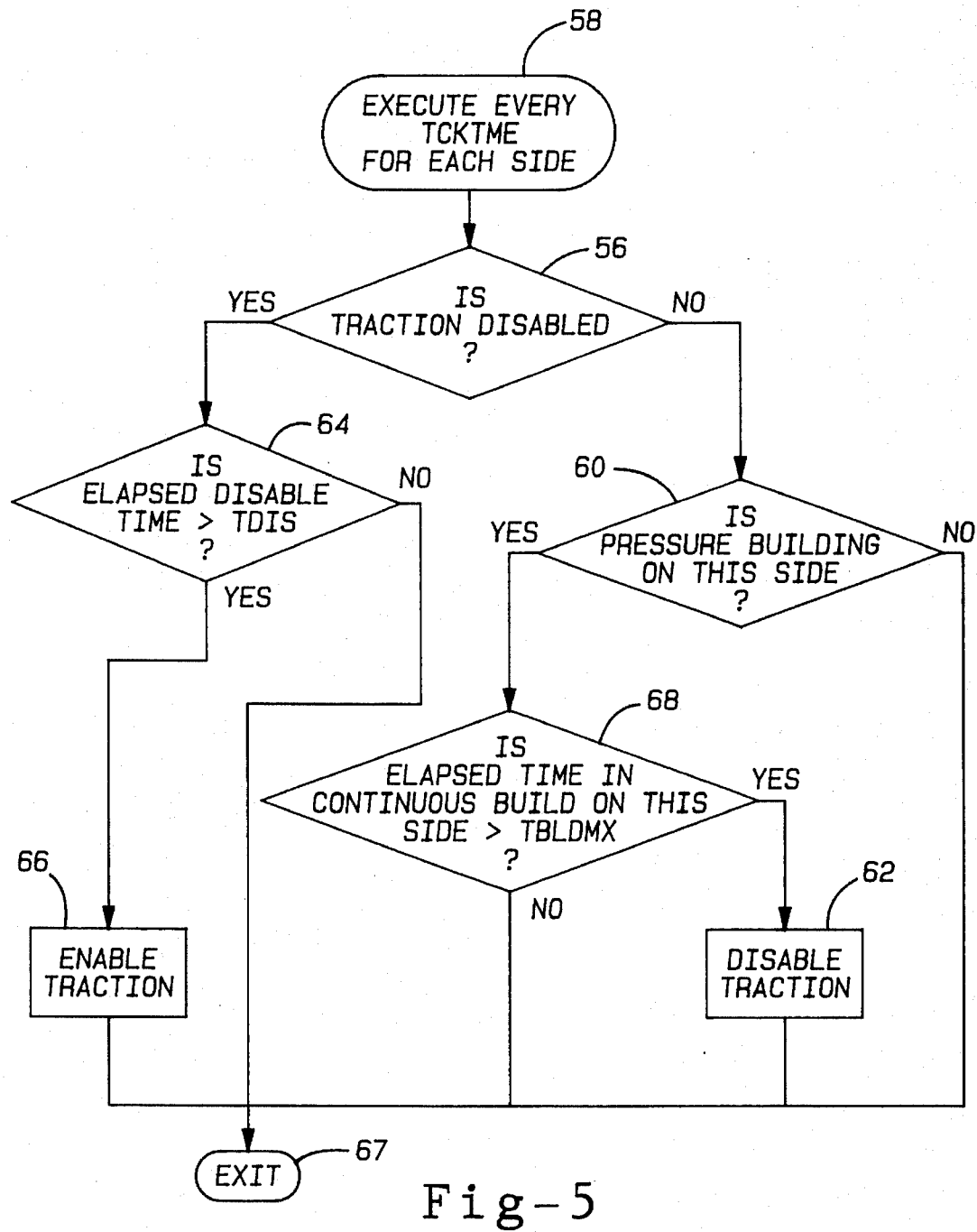

Two modes of operation of brake control system 10 where suggested above. One mode is based on counting pulses of a pressure build sequence, and the other is based on measuring time of such a sequence. The operational modes of electronic control unit 24 are shown in FIGS. 4 and 5. These figures provide a logic flow chart or routine of operation of brake control system 10 hardware and software. Block 54 provides a clock pulse input to the system designated as "TCKME". For example, a 30 millisecond timing clock pulse can be used. Block 56 resolves whether or not traction control is disabled. If not disabled, it is determined if brake chamber pressure is building on a traction wheel at block 58. If no pressure is building, the exit block 67 is reached and the routine is repeated through block 56. If chamber pressure is building on a traction wheel, block 60 inquires if the number of consecutive build commands is greater than the predetermined "maximum number of build pulses" designated as "NBLDMX" for the system which is allowed for a traction wheel. If this number has not been exceeded, exit 67 is reached and the routine is repeated. If the number of build pulses has exceeded the parameter, for example 200 pulses, traction control operation is disabled at block 62. Since for each clock pulse the routine is repeated, when traction control is disabled the software considers at block 64 if the elapsed time of traction control being disabled, designated "TDIS" exceeds a threshold, for example 7 seconds. If it has not, then the routine is repeated leaving the system disabled. If the threshold time has been exceeded, traction control is enabled at block 66. Thus, the system operates merely by counting the number of consecutive build pulses from electronic control unit 24, and since this can be provided by software modifications to an existing traction control system, this feature can be provided at a very low cost without the need to directly sense brake temperature or brake system pressure.

FIG. 5 is a logic flow diagram of a second embodiment of a routine for system 10 which is identical to that shown in FIG. 4, with the exception that block 60 is replaced by block 68. At block 68 a determination is made if pressure build control inputs occur for greater than a "max build time" parameter designated as "TBLDMX". This value could be for example 7 seconds. In all other respects the routine of FIG. 5 is identical to that of FIG. 4 and consequently, the same element numbers are used in that Figure.

The various parameters, NBLDMX, TDIS and TBLDMX are selected based on known attributes of a particular braking system and can be based on calculations on empirical studies.

It is to be understood that the invention is not limited to the exact construction illustrated and described above, but that various changes and modifications may be made without departing from the spirit and scope of the invention as defined in the following claims.

We claim:

1. A brake control system for a motor vehicle having traction control coupled to service brakes of driven wheels of the motor vehicle providing differential braking action by actuating the service brake of a spinning wheel to reduce the wheel speed of the spinning wheel thereby transferring additional torque to other of the driven wheels, comprising:

wheel speed sensors for detecting the rotational speed of said driven wheels and for generating a wheel speed signal for each of said driven wheels, brake modulator means for each of said driven wheels for receiving a brake actuation signal and actuating said service brake associated with each of said brake modulator means, and a control unit for receiving said wheel speed signals for each of said driven wheels and generating said brake actuation signal in response to a wheel spinning condition, said brake actuation signal for a spinning wheel being generated for not more than a predetermined actuation signal time period, said control unit limiting the duration of said predetermined actuation signal time period to avoid conditions which could cause adverse service brake conditions.

2. A brake control system for a motor vehicle according to claim 1 further comprising said control unit including a time clock and limiting the duration of said predetermined actuation signal time period by measuring said duration relative to time signals generated by said time clock.

3. A brake control system for a motor vehicle according to claim 1 further comprising said control unit including a time clock generating clock pulses at regular intervals and limiting the duration of said predetermined actuation signal time period by limiting said duration to a predetermined number of said clock pulses.

4. A brake control system for a motor vehicle according to claim 1 wherein said brake modulator means includes a brake modulator which controls the application of fluid pressure to a brake actuator.

5. A method of operating a brake control system for a motor vehicle having traction control of the type coupled to service brakes of driven wheels of the motor vehicle providing differential braking action by actuating the service brake of a spinning wheel to reduce the wheel speed of the spinning wheel thereby transferring additional torque to other of the driven wheels, comprising the steps of:

detecting the rotational speed of said driven wheels and generating a wheel speed signal for each of said driven wheels, providing a brake modulator means for each of said driven wheels for receiving a brake actuation signal and actuating said service brake associated with said brake modulator means, providing a controller means for receiving said wheel speed signals for each of said driven wheels and generating said brake actuation signal in response to a wheel spinning condition, said brake actuation signal for a spinning wheel being generated for not more than a predetermined actuation signal time period, and limiting the duration of said predetermined actuation signal time period to a predetermined period of time calculated to avoid conditions which could cause adverse service brake conditions.

6. A method of operating a brake control system according to claim 5, further comprising the step of:

generating a time signal and limiting the duration of said actuation predetermined signal time period by measuring said duration relative to said time signal.

7. A method of operating a traction control system according to claim 5, further comprising the step of:

generating clock pulses at regular intervals and limiting the duration of said predetermined actuation signal time period by limiting said duration to a predetermined number of said clock pulses.

* * * * *